Figure 1:
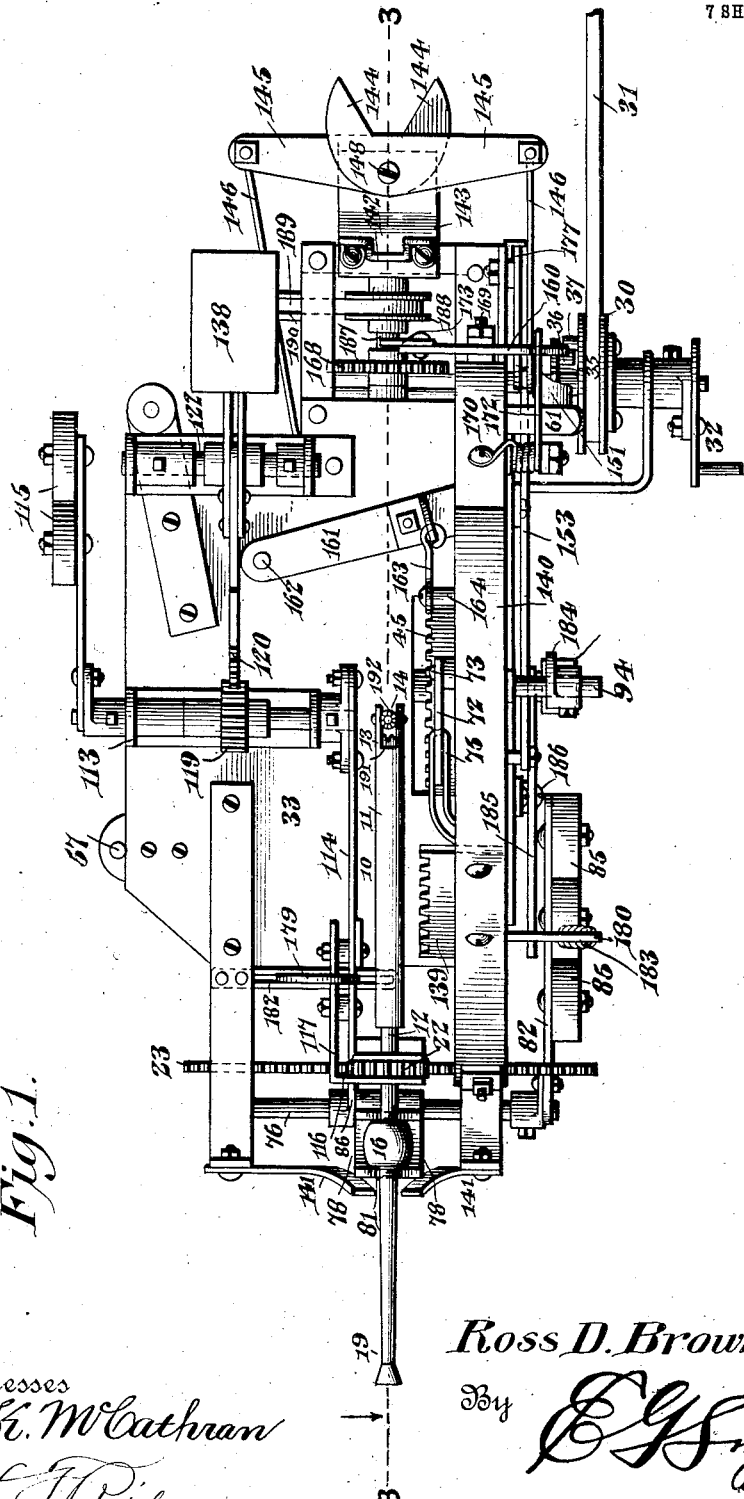

R. D. BROWN.
GLASS GATHERING MACHINE.
APPLICATION FILED APR. 15, 1907.

904,402.

Patented Nov. 17, 1908.

7 SHEETS—SHEET 1.

Witnesses
Jas. K. McCathran
H. T. Riley

Ross D. Brown, Inventor
By C. G. Siggers
Attorney

R. D. BROWN.
GLASS GATHERING MACHINE.
APPLICATION FILED APR. 15, 1907.

904,402.

Patented Nov. 17, 1908.
7 SHEETS—SHEET 3.

Witnesses

Ross D. Brown, Inventor

Attorney

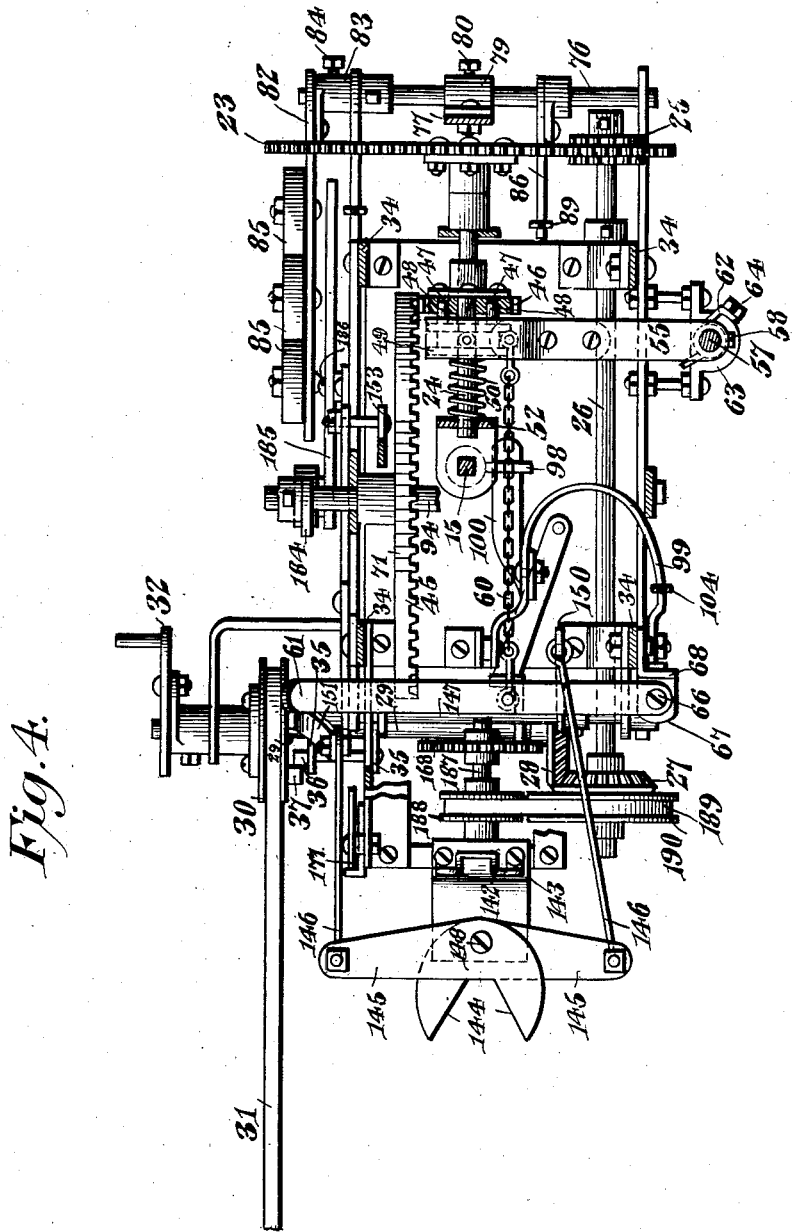

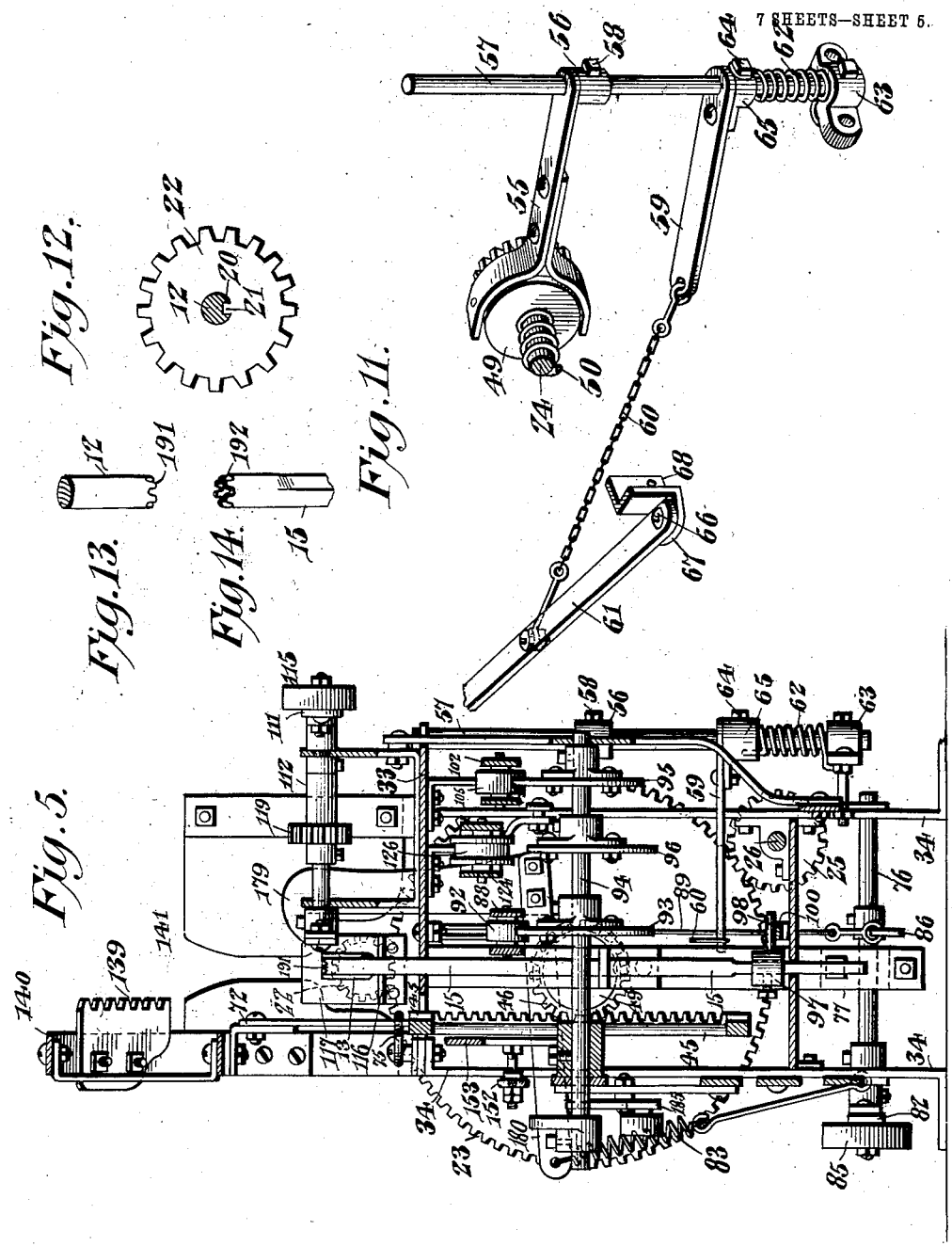

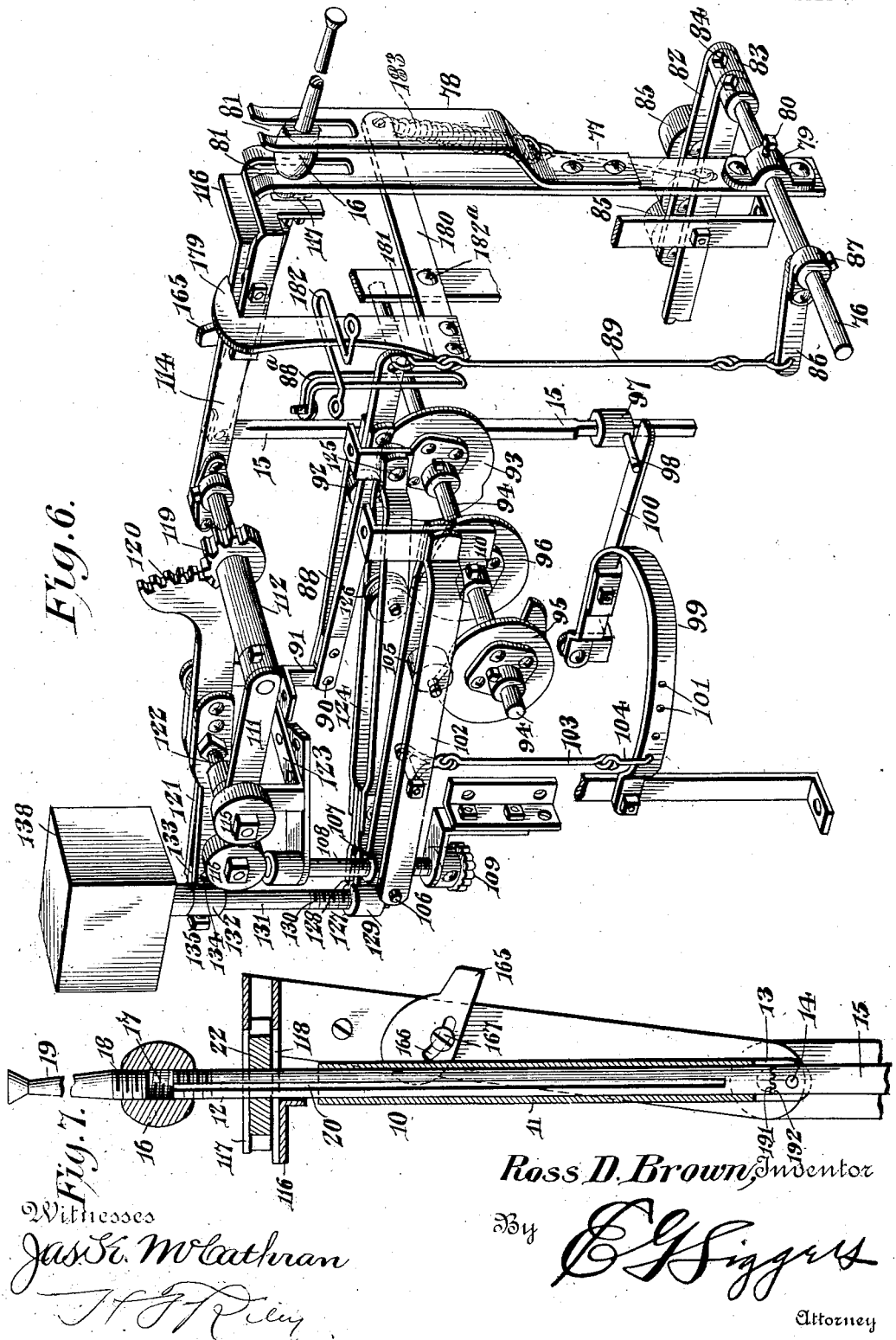

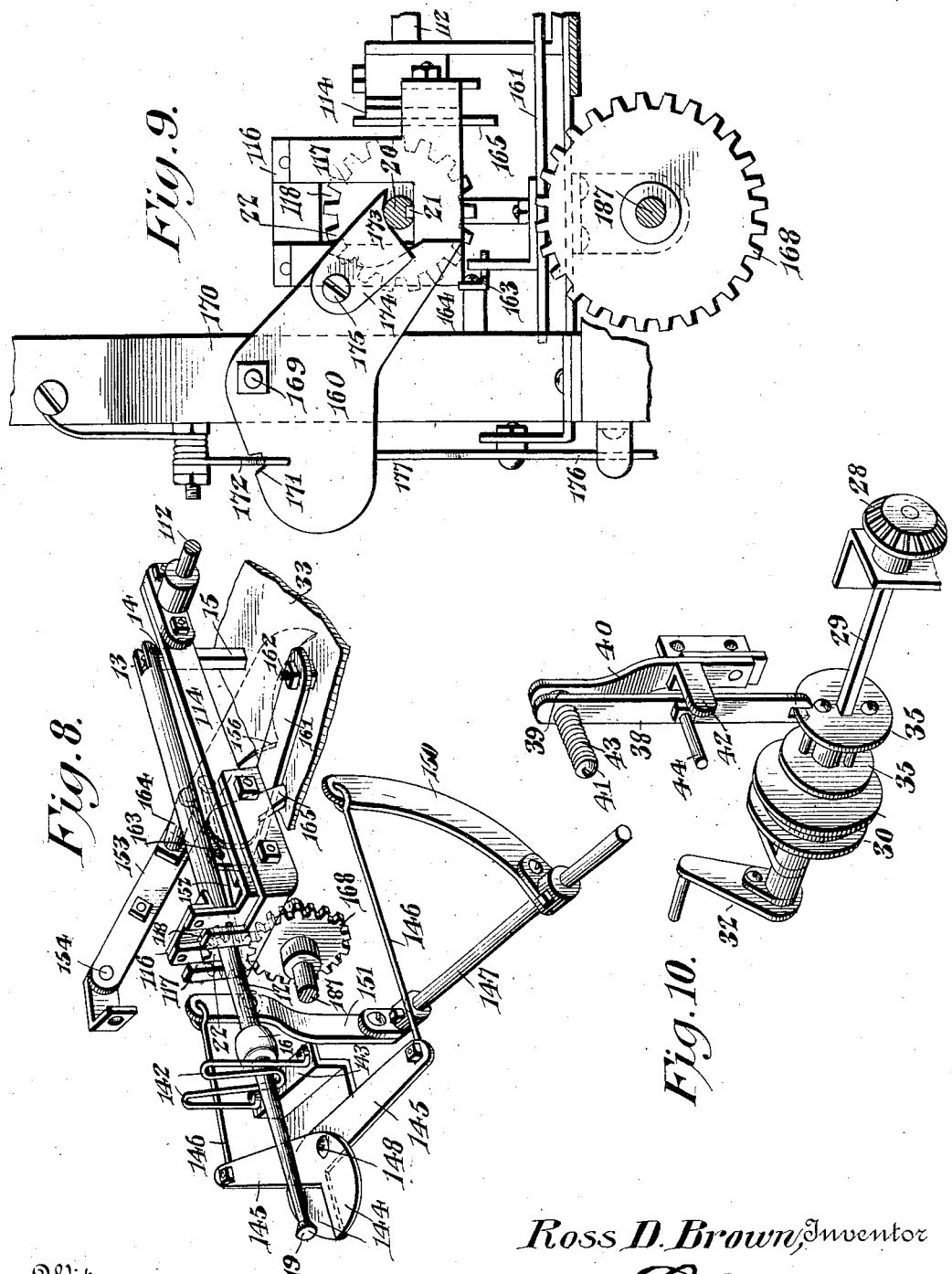

UNITED STATES PATENT OFFICE.

ROSS D. BROWN, OF MUNCIE, INDIANA, ASSIGNOR OF ONE-HALF TO ROBERT H. RIFFE, OF MUNCIE, INDIANA.

GLASS-GATHERING MACHINE.

No. 904,402.     Specification of Letters Patent.     Patented Nov. 17, 1908.

Application filed April 15, 1907. Serial No. 368,295.

*To all whom it may concern:*

Be it known that I, ROSS D BROWN, a citizen of the United States, residing at Muncie, in the county of Delaware and State of Indiana, have invented a new and useful Glass-Gathering Machine, of which the following is a specification.

The invention relates to improvements in glass gathering machines.

The object of the present invention is to improve the construction of glass gathering machines, more especially that shown and described in Patent No. 838,768, granted to me Dec. 18, 1906, and to enable the same to be readily adjusted to project the gathering instrument different distances into the tank, to arrange the machine to suit the temperature of the glass, and to enable the instrument to gather glass of the desired temperature, and capable also of adjustment to vary the upward and downward movement of the gathering instrument to gather a ball or quota of glass of the desired size, and also to maintain the gathering instrument level with the surface of the glass within the tank.

A further object of the invention is to provide automatically operable shears adapted to sever the glass from the gathering instrument without imparting a lateral or sidewise movement to the severed portion of the glass, whereby the latter is caused to drop into a mold centrally of the same, instead of being thrown to one side of the mold.

It is also the object of the invention to impart a rotary movement to the gathering instrument, prior to swinging the same forwardly from the mold to the tank, so as to wind up the glass left hanging from the end of the gathering instrument by the cutting operation.

Another object of the invention is to provide means for throwing the glass gathering mechanism out of operation as the gathering instrument is about to move forwardly or outwardly into the tank without stopping the rotary movement of the gathering instrument, so that the moil or thin coating of glass may be maintained on the head of the same in a heated condition.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 2:
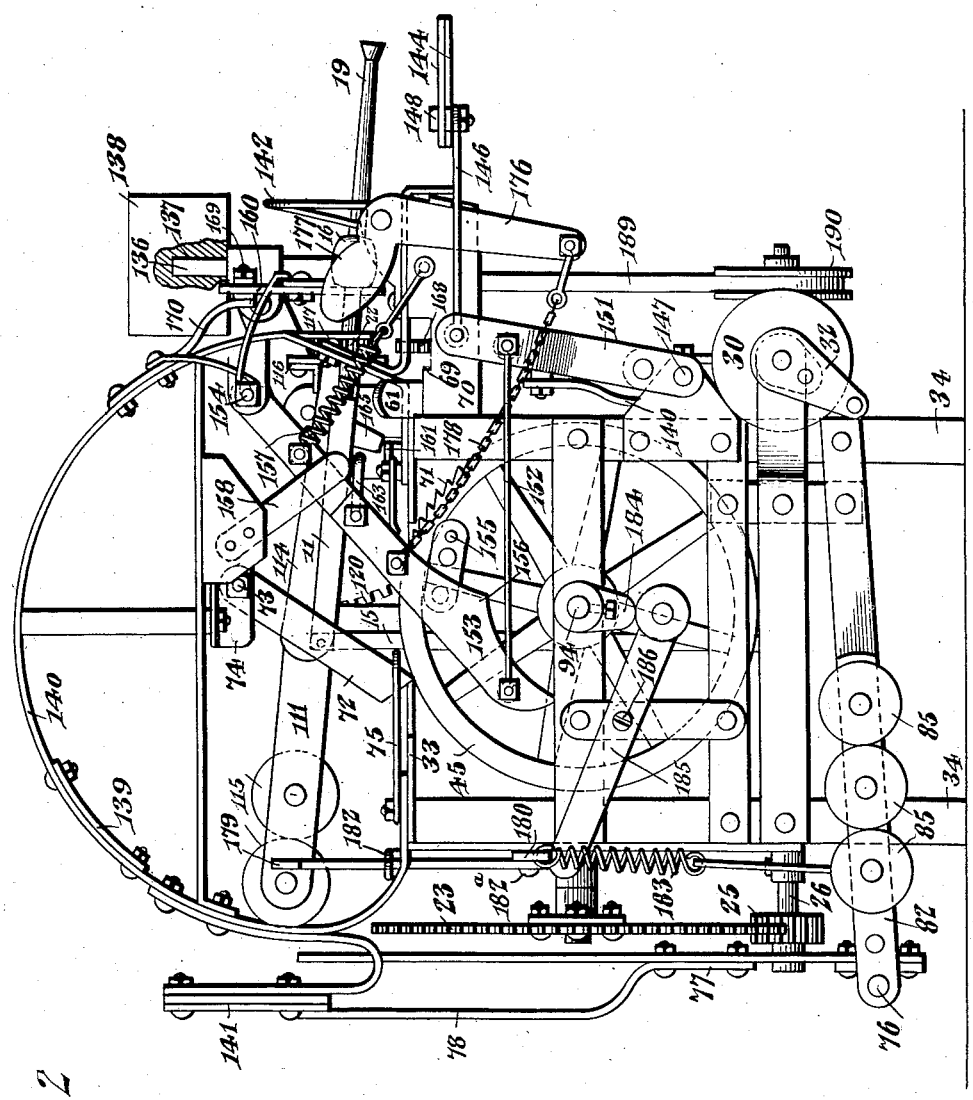
Figure 3:
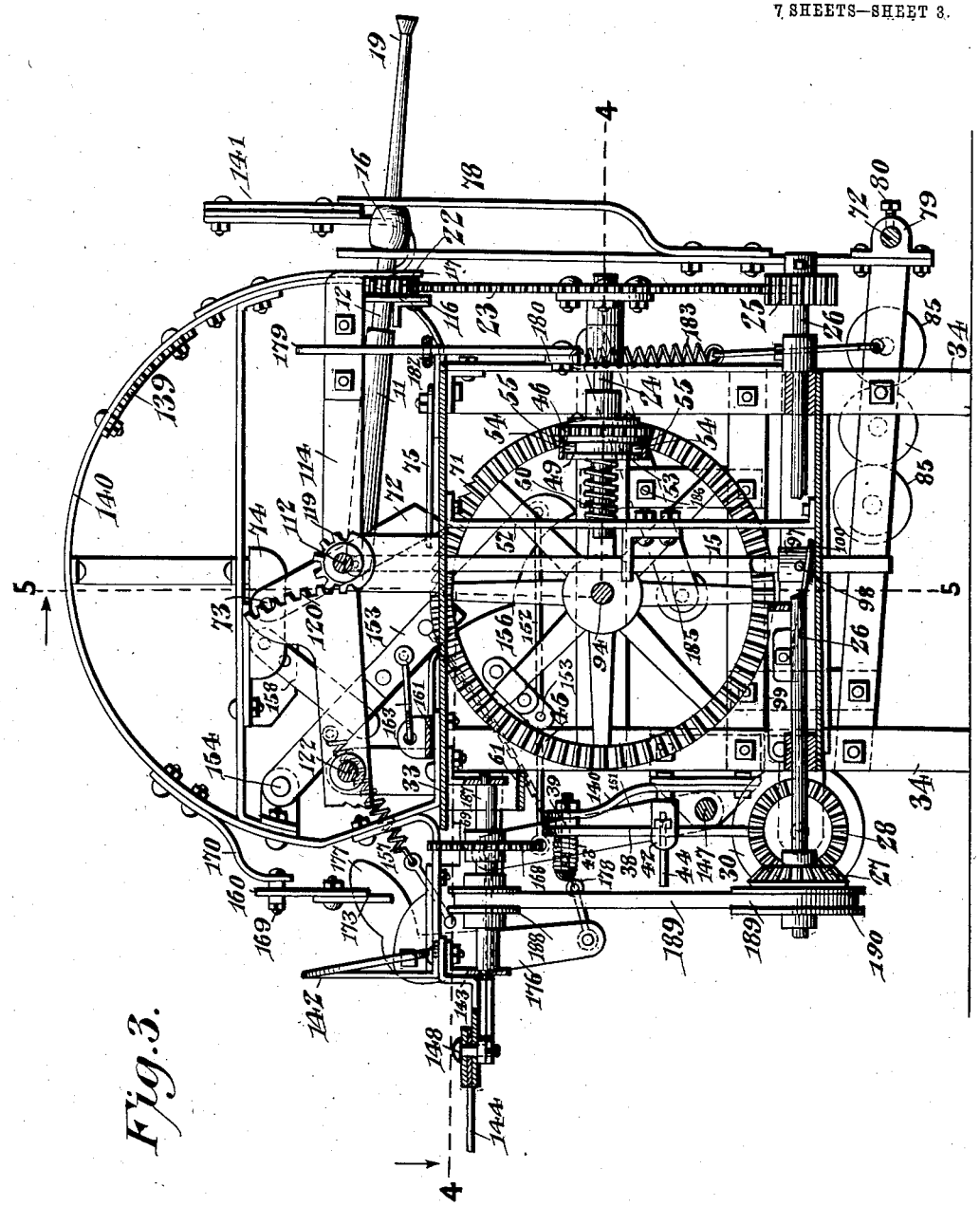

In the drawings:—Figure 1 is a plan view of a glass gathering instrument, constructed in accordance with this invention. Fig. 2 is an elevation of the same. Fig. 3 is a longitudinal sectional view on the line 3—3 of Fig. 1. Fig. 4 is a horizontal sectional view on the line 4—4 of Fig. 3. Fig. 5 is a transverse sectional view on the line 5—5 of Fig. 3. Fig. 6 is a perspective view, illustrating the arrangement of the cams and the levers for actuating the gathering instrument. Fig. 7 is an enlarged detail sectional view, illustrating the construction and manner of mounting the gathering instrument. Fig. 8 is an enlarged detail perspective view, illustrating the arrangement of the shears and the means for operating the same. Fig. 9 is an enlarged detail sectional view, illustrating the mechanism for locking the gathering instrument at the rear end of the machine. Fig. 10 is a detail perspective view, illustrating the arrangement of the clutch for throwing the machine into and out of operation. Fig. 11 is a similar view, illustrating the clutch for throwing the gathering mechanism into and out of operation. Fig. 12 is a detail sectional view, illustrating the manner of slidably interlocking the gathering instrument and the pinion, which is carried by the same. Fig. 13 is a detail perspective view of the inner end of the outer section or member of the gathering instrument. Fig. 14 is a similar view of the upper end of the vertically movable rod.

Like numerals of reference designate corresponding parts in all the figures of the drawings.

The gathering instrument 10 consists of inner and outer telescopic sections or members 11 and 12, the inner section 11 being tubular and slidably receiving the inner portion of the outer section or member 12, which terminates in a head or enlargement for gathering glass. The inner end 13 of the inner section or member of the gathering instrument is bifurcated, and is pivoted by a pin 14 to the upper end of a vertically disposed rod 15, which is adapted to be moved upwardly and downwardly, as hereinafter more fully described, to raise and lower the outer end of the gathering instrument. The outer section or member of the gathering instrument is provided with a collar 16, having a threaded socket 17 at the outer end to receive the inner threaded end 18 of the outer portion 19 of the outer section or member 12 of the gathering instrument. The socket 17 of the collar detachably receives the outer portion of the outer section, and enables a new glass-gathering end to be applied to the gathering instrument, when necessary.

The inner portion of the outer section or member 12 of the gathering instrument is provided with a longitudinal groove 20, which receives a key 21 of a pinion 22, and the latter, which is carried by the gathering instrument, is slidably interlocked with the outer section or member 12 of the same, and is adapted to impart a rotary movement to the outer section or member of the gathering instrument, when in mesh with the gearing hereinafter described. Any other suitable means, however, may be employed for slidably interlocking the pinion with the outer section or member of the gathering instrument, and the tubular inner section or member 11 forms a bearing for the outer section or member 12, which is also slidable into and out of the inner section or member 11.

When the gathering instrument is at the front of the machine, as illustrated in Figs. 1 and 3 of the drawings, the pinion 22 meshes with and is fulcrumed on a large vertically disposed gear 23, which is adapted to impart a rotary movement to the gathering instrument through the said pinion 22. The large vertically disposed gear 23, which is mounted on the front end of a short longitudinally disposed shaft 24, is relatively thin compared with the pinion 22, which projects in advance and in rear of the gear 23, when in mesh with the same. This will enable the pinion to mesh properly with the large gear 23, when arranged at different angles to the same through the vertical oscillation or tilting movement of the gathering instrument to dip the outer end or head of the same into the glass in a tank, and to lift it from the surface of the same. The upward and downward movement of the point or head of the gathering instrument is substantially vertical, and is effected after the instrument has been extended into the tank. The rotary movement enables the gathering instrument to pick up its quota of glass and retain the same on it, and the large gear 23 meshes with and is driven by a pinion 25 of a long longitudinal shaft 26. The shaft 26, which extends from one end of the frame of the machine to the other, is journaled in suitable bearings, and is connected at its rear end by bevel gears 27 and 28 with a rear transverse drive shaft 29. The drive shaft 29 extends across the rear end of the frame of the machine and carries a pulley 30, which is connected by a belt 31 with a suitable source of power. The drive shaft 29 may also be provided with a crank element 32, by means of which it may be operated. The frame of the machine may be constructed in any suitable manner, and it preferably consists of a horizontal top portion 33, and corner standards 34, which are suitably connected and braced to afford the requisite strength. The transverse drive shaft 29 is provided with a slidable clutch 35, having projections or studs 36 forming a clutch face, and adapted to interlock with a corresponding clutch face of the pulley 30, which is provided with projections 37. Any other form of clutch-engaging faces may, however, be employed, and the slidable clutch 35 is operated by a shifting lever 38, extending upwardly from the clutch and pivoted at its upper end 39 to a bracket 40 by a bolt 41, or other suitable fastening device. The bracket 40 is provided with an arm 42 for limiting the lateral movement of the clutch shifting lever 38, and the bolt 41 has a coiled spring disposed on it and engaging the lever for retaining the same in its adjusted position. The coiled spring 43 creates sufficient friction to prevent the shifting lever from accidentally moving into or out of engagement with the pulley 30. The clutch shifting lever 38 is provided at an intermediate point with a handle 44, by means of which it is operated to carry the clutch 35 into and out of engagement with the pulley 30.

Motion is communicated from the short centrally arranged longitudinal shaft 24 to a large gear or master-wheel 45 by means of a pinion 46, loosely mounted on the short longitudinal shaft 24 and having recesses 47, forming a clutch face and adapted to receive projections 48 of a slidable clutch section 49. The slidable clutch section 49, which is keyed, or otherwise secured to the short longitudinal shaft, is normally held in engagement with the pinion 46 by a coiled spring 50, disposed on the short longitudinal shaft and interposed between the slidable clutch section and a vertical bar or member 52, which constitutes a bearing and support for the inner end of the short longitudinal shaft 24. The clutch section or member 49 is provided with an annular peripheral groove 53, which is engaged by projections 54 of a forked arm 55. The arm 55 is provided with a sleeve 56, (see Fig. 11) which is secured to a vertical rock shaft or pivot 57 by a set screw 58, or other suitable fastening device.

The vertical rock shaft or pivot, which is located at one side of the frame of the machine, is journaled in suitable bearings thereof, and is provided near its lower end with an inwardly extending transversely disposed arm 59, which is connected by a chain 60, or other suitable flexible connection with a shifting lever 61. A coiled spring 62 is disposed on the lower portion of the vertical pivot or rock shaft, and is connected at its terminals with the arm 59 and with the lower bearing 63 to assist in maintaining the clutch section or member 49 normally in engagement with the pinion 46. The arm 59 is adjustably secured to the vertical shaft or pivot 57 by means of a set screw 64, which pierces a sleeve 65 of the attached end of the arm 59. The shifting lever 61, which extends across the frame of the machine at the rear end thereof, is disposed at an inclination, and its lower end is pivoted by a bolt 66 to a projecting ear or flange 67 of a bracket 68, and the chain 60 is connected with the shifting lever 61 at a point intermediate of the ends thereof. The upper portion of the inclined shifting lever 61 is arranged to engage a shoulder 69 of a keeper 70 (see Fig. 2) for holding the spring-actuated clutch section or member 49 out of engagement with the pinion 46. The large gear 45, which is arranged vertically, operates the glass gathering mechanism, which comprises the means hereinafter described for moving the extensible gathering instrument inwardly and outwardly and for raising and lowering the same to pick up a ball or quota of glass, and for oscillating the gathering instrument to swing the same from the tank to a mold, and when the clutch section or member 49 is moved out of engagement with the pinion 46, the master-wheel is thrown out of operation as the pinion 46 is loose on the short longitudinal shaft. This throws the gathering mechanism out of operation, but does not affect the rotary movement of the gathering instrument, which is rotated by the gearing, that connects the short longitudinal shaft 24 with the drive shaft. The inclined shifting lever is operated at the time, when the gathering instrument is about to be extended into the tank, and when in this position, the continuous rotary movement of the gathering instrument will retain the thin glass coating or moil on the head of the gathering instrument, and the heat of the tank will be sufficient to keep the moil or coating hot and in condition for gathering glass when the machine is again operated.

The master-wheel is preferably of a diameter and the parts are so timed that there will be a complete operation of the machine at each revolution of the master-wheel, and the latter is provided at its periphery with a series of ratchet teeth 71, arranged to be engaged by a pivoted pawl or dog 72, when the gathering instrument is about to be extended into the tank, whereby the master-wheel will be locked against backward movement to prevent the gathering instrument from accidently swinging backward, when the clutch section or member 49 is operated to stop the gathering mechanism. By the term "gathering mechanism" I mean the mechanism for oscillating the gathering instrument to move the same to and from the tank and for reciprocating the gathering instrument to move the same into and out of the tank. The pawl or dog 72, which is arranged at an inclination is pivoted at its upper end 73 to a bracket 74, and its lower end, which is pointed to provide a tooth, is maintained in engagement with the master-wheel by gravity. The lower engaging end of the pawl or dog 72 is arranged within a guide 75, consisting of a substantially horizontal loop, secured to the frame and projecting over the front portion of the master-wheel.

The extensible gathering instrument is moved into and out of the tank by means of a front horizontally disposed transverse rock shaft 76, journaled in suitable bearings of the frame of the machine and provided with an upwardly extending arm 77, having a forked upper portion 78 and provided at its lower end with a suitable eye 79, which is adjustably secured to the transverse rock shaft by a set screw 80. The sides of the upper forked portion are provided at their upper ends with slots or openings 81, through which the outer section or member 12 of the gathering instrument passes, and the said collar 16 is arranged between the sides of the forked portion 78, as clearly illustrated in Fig. 6 of the drawings, whereby the outer section or member of the gathering instrument will be moved longitudinally, when the upwardly extending arm 77 is closed. The upper terminals of the sides of the fork are flared, or bent in opposite directions, to enable the collar 16 to drop readily between the sides of the fork, when the gathering instrument is swung from the rear of the machine to the front end thereof, as hereinafter explained. When the rock shaft 76 is oscillated, the outer section of the gathering instrument will be moved inwardly and outwardly to extend it into and withdraw it from the tank. The set screw 80, which adjustably secures the arm 77 to the rock shaft, enables the gathering instrument to be extended into the tank to a greater or less degree, and as the glass within the tank is at a greater temperature at the center of the tank than at the mouth or entrance, it will be apparent that by adjusting the upwardly extending arm, the gathering instrument may be arranged to gather glass at the desired temperature and may be adjusted to suit the temperature of the glass within the tank.

The upwardly extending arm 77 is maintained at the limit of its inward or backward movement by means of a weighted arm 82, located at one side of the frame of the machine, and extending inwardly or rearwardly from the rock shaft 76. The front end of the arm 82 is preferably provided with a sleeve 83, and is secured to the said rock shaft 76 by means of a set screw 84, or other suitable fastening device, and the rear portion of the arm 22 is provided with a plurality of weights 85, but a single adjustable weight may be substituted for those shown, as will be readily understood. The weighted arm is adapted to swing the upwardly extending arm of the rock shaft inwardly or rearwardly, when it is free to do so, in the operation of the machine.

The rock shaft 76 is provided at an intermediate point with a rearwardly or inwardly extending arm 86, adjustably secured at its front end to the rock shaft 76 by means of a set screw 87, or other suitable means, and connected at its rear end with a cam actuated lever 88 by means of a flexible connection 89, consisting of a plurality of links, as clearly illustrated in Fig. 6 of the drawings. The lever 88, which is disposed longitudinally of the machine, is pivoted at its rear end 90 to a depending arm or portion of a bracket 91, and it has two spaced sides or members and is provided between the same at a point intermediate of its length with an anti-friction wheel 92, which is arranged to rest upon a cam 93. The front end of the longitudinal lever operates in a vertical guide 88ª, and is provided with a perforation to receive the upper loop of the flexible connection 89. The guide 88ª, which is substantially U-shaped, is secured to and depends from the top of the frame, but the front end of the lever 88 may be guided in any other manner.

The cam 93, which consists of a substantially circular disk or plate, is provided at its periphery with an eccentrically arranged portion, adapted to swing the lever 88 upwardly to rock the shaft 76, and thereby swing the upwardly extending arm 77 outwardly to carry the gathering instrument into the tank. The weight of the lever 82 and the lever 88 will swing the arm 77 inwardly, when permitted to do so by the rotary movement of the cam 93. The cam 93 is mounted on a transverse shaft 94. The transverse shaft 94, which extends entirely across the machine, carries the said master-wheel 45, and also has cams 95 and 96, which are adapted, through the mechanism hereinafter described, to raise and lower the head or outer end of the gathering instrument and swing the same to and from the tank. The vertically movable rod 15, which is preferably square, or of other polygonal shape in cross section, and which is slidably mounted in suitable guide openings of the frame, is provided at its lower portion with a vertically adjustable collar or sleeve 97, having a laterally extending horizontally disposed arm 98, which is arranged to be engaged by a lower lever 99. The lower lever 99, which may be of any preferred construction, consists of a substantially U-shaped body portion, pivotally mounted at its ends and provided at one side with a straight arm 100, which extends beneath the projecting pin or arm 98 of the sleeve 97 of the vertically movable rod. The lower lever 99 is arranged horizontally, and the outer side of the U-shaped portion is provided with a plurality of perforations 101, and is connected with an upper cam actuated lever 102 by a flexible connection 103, consisting of a rod and upper and lower links, the lower link 104 being adapted to be arranged in any one of the perforations 101 to secure the desired movement of the lever 99 and to assist in regulating the pressure of the lever 102 on the cam 95. The lever 102, which is composed of two spaced sides or members, is provided at an intermediate point with an anti-friction wheel 105, and it is fulcrumed at its rear end on a pivot 106, which is carried by an interiorly threaded sleeve 107. The sleeve 107 is arranged on a vertically disposed adjusting screw 108, suitably mounted on the frame and provided at its lower end with a head 109. The screw 108 is adapted to be rotated by hand without stopping the machine to raise and lower the fulcrumed point of the lever 102 for raising and lowering the gathering instrument to adjust the same to gather a ball or quota of glass the desired size, and also to adjust the gathering instrument to correspond with the level of the glass within the tank. The front end of the lever 102 is guided on a depending arm 110, the front terminals of the sides or members of the lever 102 being bent inwardly, and arranged at the opposite faces of the arm 110, which depends from the top of the frame. The front end of the lever 102 may be guided in any other desired manner, and the cam 95, which is provided at its periphery with an eccentrically arranged portion, is adapted to engage the anti-friction wheel 105 and swing the lever 102 upward. The upward movement of the lever 102 lifts the vertically movable rod 15, through the lower lever 99. When the vertically movable rod 15 is raised, the gathering instrument is oscillated, and its outer end or head is moved downwardly to carry the same to the glass within the tank. The weight of the upper and lower levers 99 and 102 together with that of the vertically movable rod 15 is sufficient to oscillate the gathering instrument and raise the outer end or head thereof, when permitted to do so by the rotary movement of the cam 95, which operation takes place when the gathering instrument has picked up, or gathered a ball of glass of the desired size.

At the completion of the upward movement of the outer end of the gathering instrument, the latter is withdrawn from the tank by a backward movement of the forked arm 77, effected through a downward movement of the weighted arm 82 of the rock shaft 76 due to the rotary movement of the cam 93.

After the gathering instrument is withdrawn from the tank, it is swung backward over the top of the machine in a vertical plane from the position illustrated in Fig. 1 of the drawings to that shown in Figs. 2 and 3. During this oscillatory movement of the gathering instrument, the latter is counterbalanced by a weighted arm 111 of a vibratory shaft 112, disposed transversely of the machine and journaled in suitable bearings of a bracket 113, and provided with an arm 114, which loosely receives the gathering instrument. The weighted arm 111, which is located at the outer end of the vibratory shaft 112, is provided with a plurality of weights 115, but a single adjustable weight may be employed, as will be readily understood. The arm 114, which is arranged at the inner end of the vibratory shaft 112, is provided with a slotted guide 116, composed of two laterally projecting flanges, one of the flanges being provided with a slot 117 and the other having an opening 118. The outer section or member 12 of the extensible gathering instrument passes through the slot 117 and the opening 118, and the pinion 22 operates in the space between the flanges of the guide 116. The slot 117 and the opening 118 permit a limited play or movement of the gathering instrument independently of the arm 114.

The vibratory shaft is provided with a mutilated pinion 119, which meshes with an oscillatory toothed segment 120 of a lever 121. The lever 121, which is disposed longitudinally of the machine, is fulcrumed between its ends on a transverse pivot 122, which is supported by upwardly extending arms of a bracket 123. The rear arm of the lever 121 is connected with a cam actuated lever 124, fulcrumed at its front end 125 on a suitable bracket of the frame, and provided with spaced sides or members between which is mounted an anti-friction wheel 126. The anti-friction wheel 126 is arranged above and rests upon the cam 96, which during the rotary movement of the transverse shaft 94, is adapted to swing the lever 124 upwardly for oscillating the toothed segment 120, whereby the vibratory shaft is actuated to swing the gathering instrument from the front of the machine to the rear end thereof. The rear end of the cam actuated lever 124 is pivoted by a suitable fastening device 127 to an ear or flange 128 of a sleeve 129. The sleeve 129 engages screw threads 130 of the lower portion of a substantially vertical rod 131, which connects the levers 121 and 124. The upper portion of the rod passes through an upper sleeve 132, provided with an ear or flange 133, which is pivoted to the rear end of the lever 121 by a suitable fastening device 134. The sleeve 132 is provided with a set screw 135, which engages the rod 131. The fastening device 127 is removable and permits the sleeve 129 to be disconnected from the rear end of the cam actuated lever 124, when it is desired to adjust the parts. The sleeve 129, when detached from the cam actuated lever 124, is adapted to be rotated to raise and lower it on the rod 131, and thereby vary the length of the effective or connecting portion of the rod. The rod 131 projects above the lever 124, and the upwardly projecting portion 136 fits into a socket 137, formed in the lower face of a weight 138. The weight 138, which may be mounted in any other preferred manner, actuates the lever 124 to return the gathering instrument to the front of the machine, and it maintains the lever 124 in engagement with the cam 96.

The gathering instrument is rotated during its oscillatory stroke or movement to retain the glass on it, and this movement is effected by means of a curved rack 139, provided with teeth, arranged to mesh with the pinion 22. The curved rack 139 is mounted on an arch 140, extending from the front to the back of the machine and supported by suitable braces. The toothed rack 139, which imparts a positive rotary movement to the gathering instrument, is of a length to actuate the gathering instrument during one half of a revolution of the same. This produces sufficient rotary movement to retain the glass on the gathering instrument during the oscillation thereof, and the glass will begin to drop from the end of the gathering instrument, when the latter arrives at a point above the mold (not shown).

The extensible gathering instrument is prevented, by front and rear guards 141 and 142, from being thrown outward too far by centrifugal force. The rear guards 142, which extend upwardly from the top of the frame, are spaced apart to provide a passageway for the gathering instrument and are in the form of loops, and they prevent the head of the gathering instrument from being thrown outward to a point beyond the mold. These guards 142, which are in the form of loops, are constructed of a single piece of metal, and the inner sides of the loops are connected by a bottom transverse portion 143, but any other form of guard may be employed.

The front guards 141, which guide the collar into the space between the sides of the fork of the arm 77, are enlarged to form shields to protect the attendant from the heat of the glass tank. These combined guards and shields 141 are spaced apart to provide a passage-way for the gathering instrument, and the intervening space between the front guards 141 is enlarged at the bottom to permit the outward movement of the forked arm and the collar 16 carried by the same.

When the gathering instrument reaches the limit of its backward oscillatory movement and ceases to rotate, the glass drips from the outer end or head into the mold, which is properly placed to receive the glass, and the latter is automatically severed by means of cutting mechanism, consisting of a pair of shears, composed of two movable blades or jaws 144, provided with oppositely disposed laterally extending arms 145, arranged at an angle to the blades and connected by inwardly extending rods 146 with a transverse rock shaft 147, journaled in suitable bearings at the rear end of the machine. The blades or jaws of the shears are pivoted by a suitable fastening device 148 to a bracket or projecting portion of the frame of the machine, and as both of the blades or jaws are movable in the cutting operation, the severed portion of glass will not be thrown laterally to one side of the mold, but will be caused to drop into the center of the same.

The rock shaft 147 is provided with inner and outer arms 150 and 151, to which the inner ends of the rods 146 are secured. These arms 150 and 151 extend upwardly from the rock shaft, and the outer arm is connected by a rod 152 with the lower portion of an inclined lever 153, fulcrumed at its upper end 154 on an arm or extension of the arch 140 at the rear side thereof, and extending downwardly and forwardly therefrom. The lower portion of the inclined lever is located in the path of an eccentrically arranged pin or crank element 155, and has its rear edge 156 oppositely beveled at the lower end to provide a tapered portion, adapted to be engaged by the eccentrically arranged pin 155, whereby the inclined lever is swung upwardly to actuate the cutting mechanism. The upper edge of the tapered portion is substantially straight, and the lower edge of the tapered portion is curved, as clearly shown in Fig. 2 of the drawings.

The inclined lever is moved downwardly by gravity and by means of a coiled spring 157, secured to the upper portion of the lever and to the frame of the machine, and the lever is guided in its movement by an inclined arm 158. The inclined lever also operates a rear catch 160 and a pivotally mounted buffer or support 161. The support 161, which is disposed transversely of the top of the frame of the machine at the rear portion thereof, is pivoted at its inner end 162 and its outer portion, which is located at one side of the machine, is connected by a short link 163 with the inclined lever 153, which is provided with a suitable pivot 164. The inner arm 114 of the vibratory shaft is provided with a projection 165, arranged to rest upon the pivoted support, when the gathering instrument is at the back of the machine for depositing the glass in the mold. The projection is preferably formed integral with an adjustable plate, having a slot 166 and adjustably secured to the inner arm 114 of the vibratory shaft by means of a set screw 167, or other suitable fastening device. The projection, when arranged on the pivoted support, maintains the pinion 22 out of mesh with a continuously rotating gear 168, and when the support 161 is withdrawn from the projection 165, the pinion 22 is carried downward by the gathering instrument into mesh with the continuously rotating gear 168, whereby the gathering instrument is rotated. This rotary movement of the gathering instrument is effected at the end of the cutting operation, to cause the gathering instrument to wind up the glass left hanging from the gathering instrument after the cutting operation.

The pivoted support 161 is withdrawn from beneath the projection 165 of the gathering instrument by the forward movement of the inclined lever, which simultaneously operates the cutting mechanism. This movement of the inclined lever also releases the gathering instrument by swinging the rear catch 160 out of engagement with the same, and this movement of the catch operates to positively swing the gathering instrument downward to carry the pinion 22 into mesh with the continuously rotating gear 168, so that the glass, which is left hanging from the head of the gathering instrument, will be positively wound up by the same. The rear catch 160, which is provided with inner and outer angularly related arms, is pivoted at its angle by a bolt 169. This catch 160 is mounted on an arm or bracket 170 of the arch 140, and its outer arm, which is provided at its upper edge with a notch 171, is engaged by a spring 172, which is adapted to throw the inner arm of the catch 160 upwardly.

The inner arm of the catch carries a tooth or engaging portion 173, formed on the outer end of a plate or piece 174, which is adjustably secured to the inner arm of the catch by means of a screw 175, or other suitable fastening device. When the catch is in engagement with the gathering instrument, the tooth 173 bears against the upper face of the outer section or member, and extends beyond the inner side of the same. The outer arm of the catch is engaged at its lower edge by a substantially L-shaped lever 176, fulcrumed at its angle and having a lower substantially vertical arm and an upper inclined arm. The upper inclined arm is provided with an upper curved edge 177, which engages the rear catch, and when the inclined lever is swung forwardly by the master-wheel in the operation of the cutting mechanism, the L-shaped lever actuates the rear catch and swings the inner arm thereof downwardly. The tooth or engaging portion of the rear catch throws the gathering instrument downward and causes the pinion 22 of the gathering instrument to mesh with the continuously rotating gear for automatically winding up the glass on the gathering instrument. When the catch releases the gathering instrument, the latter is swung to the front of the machine by the downward movement of the weight 138, which actuates the vibratory shaft. The continuously rotating gear imparts a sufficient rotary movement to the gathering instrument to wind up the glass, and this automatic rewinding of the glass may be advantageously employed in machines where the glass is severed by hand, and the unused glass will be returned to the tank. The lower arm of the lever 176 is connected with the inclined lever by means of a chain 178, but any other suitable means may be employed for connecting these levers.

The gathering instrument, when at the front of the machine, is locked against backward movement by means of a front catch 179, consisting of a substantially L-shaped lever having a horizontal arm 180 and an upwardly extending arm 181. The front catch 179 consists of a tooth or portion projecting from the upper end of the arm 181 and arranged to engage the upper edge of the inner arm 114 of the vibratory shaft. The upwardly extending arm 181 operates in a horizontal guide 182, consisting of a substantially U-shaped loop having the terminals of its sides bent outwardly and provided with eyes, through which pass slidable fastening devices for securing the guide to the frame of the machine. The horizontal arm is pivotally connected with the frame of the machine by a screw 182ª, or other suitable fastening device, located adjacent to the upwardly extending arm. The outer end of the horizontal arm is connected with the frame of the machine by means of a coiled spring 183, which actuates the catch to carry the same into engagement with the arm 114. The front catch is thrown out of engagement with the arm 114 by a cam 184, which engages a longitudinally disposed lever 185. The lever 185, which is fulcrumed at an intermediate point on the frame by a suitable pivot 186, has its inner arm weighted and located beneath the cam 184, which is arranged at one end of the transverse shaft 94. The front or outer arm of the lever 185 is arranged beneath the horizontal arm 180 of the L-shaped lever, which carries the front catch 179. When the inner arm of the lever 185 is swung downward by the cam in the rotary movement of the shaft 94, the spring actuated catch 179 is disengaged from the inner arm 114 of the vibratory shaft.

The continuously rotating gear 168 is mounted on a short longitudinally disposed shaft 187, which carries a pulley 188, and the latter is connected by a belt 189 with a pulley 190, which is mounted on the longitudinal side shaft 26. Any other suitable means, however, may be employed for connecting the continuously rotating gear with the driving mechanism.

The inner end of the outer section of the gathering instrument is provided with teeth 191, which are adapted when the gathering instrument is oscillated to engage corresponding teeth 192 of the upper end of the vertically movable rod to check and hold the gathering instrument against further rotary movement. This will prevent any glass collecting at the front end of the gathering instrument from lapping around the same. The curved rack 139 through the pinion rotates the gathering iron one half of a revolution during the oscillatory movement of the said iron, and this partial revolution of the instrument is just sufficient to cause the glass on the end of the gathering instrument to point to the mold at the completion of the oscillatory movement. The teeth 191 and 192, which form a partial lock, do not interfere with the rotary movement of the gathering instrument while the pinion 22 is in mesh with the curved rack 139. As soon, however, as the pinion leaves the curved rack, the teeth 191 and 192 will interlock and hold the gathering instrument against further rotary movement, so that only one half of a revolution will be imparted to the gathering instrument. If it were not for the teeth, the impetus imparted to the gathering instrument would cause a continuous rotary movement of the same, and the glass would be permitted to wrap around the instrument, but by holding the gathering instrument against further rotary movement, the glass will be prevented from wrapping around the same, and will drop into the mold at the completion of the oscillatory movement.

When the gathering instrument is at the front of the machine, as illustrated in Figs. 1 and 3 of the drawings, it is constantly rotated by the gearing, and it is extended by the arm 77 of the front transverse rock shaft to move it into the tank, after which the outer end or head of the gathering instrument is moved downwardly to the glass to enable it to pick up its quota. The gathering instrument is then withdrawn from the tank and it is oscillated to swing it backwardly to a mold (not shown.) During such oscillatory movement, it is partially rotated by the fixed curved rack and the pinion 22 to prevent the glass from dropping or sagging from the head of the gathering instrument. This rotary movement ceases before the glass reaches the mold, and at the end of the oscillatory movement of the gathering instrument, the glass is permitted to drop and the desired portion is severed by the cutting mechanism. The remaining portion of glass is wound up on the head of the gathering instrument and is carried back to the tank to be used over again.

Having thus fully described my invention, what I claim as new and desire to secure by Letters Patent, is:—

1. A glass gathering machine provided with a rotary extensible glass gathering instrument consisting of inner and outer sections or members, the outer section or member being composed of inner and outer portions, the inner portion being provided with a collar having a socket detachably receiving the outer portion, and means for moving the outer section inwardly and outwardly, said means coöperating with and engaging the said collar.

2. In a glass gathering machine, the combination with a pivotally mounted oscillatory rotary gathering instrument, of means for rotating the same, means for moving the gathering instrument into and out of a pot or tank, means for oscillating the gathering instrument to move the same to and from the pot or tank, means for stopping the glass gathering operation without interfering with the rotary movement of the gathering instrument, and means for locking the gathering instrument against oscillation when the glass gathering operation is stopped.

3. In a glass gathering machine, the combination with a pivotally mounted extensible rotary gathering instrument, of a pinion carried by the same, a gear arranged to receive the pinion for imparting a rotary movement to the gathering instrument, means for rotating the gear, means for operating the gathering instrument to move the same into and out of a tank or pot and to oscillate the gathering instrument, and a clutch for throwing the last mentioned means out of operation to stop the gathering operation without interfering with the rotary movement of the gathering instrument.

4. In a glass gathering machine, the combination of a pivotally mounted oscillatory rotary gathering instrument, means for oscillating the same, a pinion carried by the instrument, a gear arranged to receive the pinion, a transverse drive shaft having a clutch, a longitudinal shaft extending from the drive shaft to the said gear, and gearing for connecting the longitudinal shaft with the drive shaft and with the said gear.

5. In a glass gathering machine, the combination with a pivotally mounted rotary gathering instrument, of a pinion carried by the same, a gear meshing with the pinion, driving mechanism for operating the gear, means for moving the gathering instrument into and out of a tank or pot, means for oscillating the gathering instrument, a master gear connected with and actuating the said means, and gearing having a clutch and connecting the first mentioned gear with the master gear.

6. In a glass gathering machine, the combination with a pivotally mounted oscillatory gathering instrument, a pinion carried by the same, a short longitudinal shaft, a gear mounted on the short longitudinal shaft and meshing with the pinion, driving mechanism for rotating the gear, means for moving the gathering instrument into and out of a tank or pot, means for oscillating the gathering instrument to carry the same to and from the tank or pot, a master-wheel connected with and actuating the said means, a loose pinion mounted on the longitudinal shaft and meshing with the master-wheel, a slidable spring actuated clutch mounted on the said shaft and arranged to lock the loose pinion rigid with the shaft, and means for operating the clutch.

7. In a glass gathering machine, the combination with a pivotally mounted oscillatory gathering instrument, a pinion carried by the same, a short longitudinal shaft, a gear mounted on the short longitudinal shaft and meshing with the pinion, driving mechanism for rotating the gear, means for moving the gathering instrument into and out of a tank or pot, means for oscillating the gathering instrument to carry the same to and from the tank or pot, a master-wheel connected with and actuating the said means, a loose pinion mounted on the longitudinal shaft and meshing with the master-wheel, a slidable spring actuated clutch mounted on the said shaft and arranged to lock the loose pinion rigid with the shaft, a rock shaft having a shifting arm connected with the clutch, and a shifting lever connected with the rock shaft.

8. In a glass gathering machine, the combination with a pivotally mounted oscillatory gathering instrument, a pinion carried by the same, a short longitudinal shaft, a gear mounted on the short longitudinal shaft and meshing with the pinion, driving mechanism for rotating the gear, means for moving the gathering instrument into and out of a tank or pot, means for oscillating the gathering instrument to carry the same to and from the tank or pot, a master-wheel connected with and actuating the said means, a loose pinion mounted on the longitudinal shaft and meshing with the master-wheel, a slidable clutch mounted on the said shaft and arranged to lock the loose pinion rigid with the shaft, a rock shaft having an arm connected with the clutch, a shifting lever for operating the rock shaft, and a spring disposed on the rock shaft for actuating the same.

9. In a glass gathering machine, the combination with a pivotally mounted oscillatory gathering instrument, a pinion carried by the same, a short longitudinal shaft, a gear mounted on the short longitudinal shaft and meshing with the pinion, driving mechanism for rotating the gear, means for moving the gathering instrument into and out of a tank or pot, means for oscillating the gathering instrument to carry the same to and from the tank or pot, a master-wheel connected with and actuating the said means, a loose pinion mounted on the longitudinal shaft and meshing with the master-wheel, a slidable clutch mounted on the said shaft and arranged to lock the loose pinion rigid with the shaft, a vertical rock shaft having upper and lower arms, the upper arm being connected with the clutch, a spring disposed on the rock shaft for moving the same in one direction, a shifting lever connected with the lower arm for moving the rock shaft in the opposite direction, and a keeper arranged to be engaged by the shifting lever for holding the clutch out of engagement with the loose pinion.

10. In a glass gathering machine, the combination with a pivotally mounted extensible glass gathering instrument, a rock shaft having an arm for moving the glass gathering instrument into and out of a pot or tank, a weighted arm mounted directly on the shaft for moving the same in one direction, and cam actuated means having a connection with the rock shaft independent of the weighted arm for moving the rock shaft in the opposite direction.

11. In a glass gathering machine, the combination of a pivotally mounted extensible glass gathering instrument, a transverse rock shaft provided with an upwardly extending arm for moving the gathering instrument into and out of a pot or tank, a rearwardly extending arm connected with the rock shaft, a lever fulcrumed at one end and connected at the other end with the rearwardly extending arm, a cam for actuating the said lever to move the rock shaft in one direction, and a weighted arm extending from and mounted directly on the rock shaft to move the same in the opposite direction.

12. In a glass gathering machine, the combination of a vertically movable rod, a glass gathering instrument pivotally mounted at its inner end on the rod, means for fulcruming the glass gathering instrument at an intermediate point, means for actuating the said rod to dip the gathering instrument into the glass of a tank or pot, and an adjusting screw carried by the rod actuating means for varying such dipping movement without stopping the machine.

13. In a glass gathering machine, the combination of a vertically movable rod, a glass gathering instrument pivotally mounted on the rod, means for fulcruming the gathering instrument, and means for actuating the rod to dip the gathering instrument into the glass of a tank or pot, the last mentioned means embodying a cam, a lever operated by the cam, and an adjustable fulcrum for the lever.

14. In a glass gathering machine, the combination of a vertically movable rod, a glass gathering instrument pivotally mounted on the rod, means for fulcruming the gathering instrument, a cam, a lever actuated by the cam and connected with the rod for dipping the gathering instrument into the glass of a tank or pot, and means for shifting the fulcrum of the lever for varying the dipping movement of the gathering instrument.

15. In a glass gathering machine, the combination of a vertically movable rod, a glass gathering instrument pivotally mounted on the rod, means for fulcruming the gathering instrument, a cam, a lever actuated by the cam and connected with the rod for dipping the gathering instrument into the glass of a tank or pot, and an adjustable screw for shifting the fulcrum of the lever to vary the dipping movement of the gathering instrument without stopping the glass gathering machine.

16. In a glass gathering machine, the combination of a vertically movable rod, a glass gathering instrument pivotally mounted on the rod, means for fulcruming the gathering instrument, a cam, a lever actuated by the cam and connected with the rod for dipping the gathering instrument into the glass of a tank or pot, an interiorly threaded sleeve on which the lever is fulcrumed, and a rotary screw engaging the sleeve for shifting the fulcrum of the lever.

17. In a glass gathering machine, the combination of a vertically movable rod, a glass gathering instrument pivotally mounted on the rod, means for fulcruming the glass gathering instrument, a lower lever having a substantially U-shaped body portion and provided with an arm for actuating the said rod, an upper lever connected with the lower lever, and a cam for actuating the upper lever.

18. In a glass gathering machine, the combination of a vertically movable rod, a glass gathering instrument pivotally mounted on the same, means for fulcruming the gathering instrument, an adjustable collar secured to the rod and having a projection, a lower lever arranged to engage the said projection to shift the rod, an upper lever connected with the lower lever, and a cam for actuating the upper lever.

19. In a glass gathering machine, the combination of a glass gathering instrument pivotally mounted at its inner end, means for fulcruming the gathering instrument at an intermediate point, a lever, means for connecting the lever with the inner end of the gathering instrument to dip the latter into the glass of a tank or pot, a cam for actuating the lever, and means for adjusting the lever without stopping the machine for varying the dipping movement of the gathering instrument.

20. In a glass gathering machine, the combination of a pivotally mounted extensible gathering instrument, means for moving the gathering instrument into and out of a tank or pot, means for oscillating the gathering instrument to carry the same to and from the said tank or pot, and means for automatically locking the gathering instrument against swinging during the inward and outward movement of the said instrument.

21. In a glass gathering machine, the combination of a pivotally mounted extensible gathering instrument, means for moving the gathering instrument into and out of a tank or pot, means for oscillating the gathering instrument to carry the same to and from the said tank or pot, an automatically operable catch arranged to lock the gathering instrument against swinging movement during the inward and outward movement of the same, and means for releasing the gathering instrument at the limit of its inward or backward movement.

22. In a glass gathering machine, the combination of a pivotally mounted extensible gathering instrument, means for moving the same into and out of a pot or tank, means for oscillating the gathering instrument, an automatically operable catch arranged to lock the gathering instrument against swinging movement during the inward and outward movement thereof, and cam actuated means for releasing the catch at the completion of such inward and outward movement.

23. In a glass gathering machine, the combination of a pivotally mounted extensible glass gathering instrument, means for moving the same into and out of a pot or tank, a lever carrying a catch for locking the gathering instrument against swinging movement during the inward and outward movement thereof, a spring for actuating the lever, a rotary cam, and a lever arranged in the path of the cam and engaging the first mentioned lever to operate the catch and release the gathering instrument at the completion of its inward and outward movement.

24. In a glass gathering machine, the combination of a pivotally mounted extensible gathering instrument arranged to swing longitudinally of the machine, means for moving the gathering instrument into and out of a pot or tank, a transversely disposed approximately L-shaped lever provided at one of its arms with a catch for locking the gathering instrument against swinging movement, a spring connected with the L-shaped lever, a longitudinally disposed weighted lever fulcrumed at an intermediate point and engaging the other arm of the L-shaped lever, and a cam for actuating the weighted lever.

25. In a glass gathering machine, the combination of a pivotally mounted glass gathering instrument, a vibratory shaft having an arm connected with the gathering instrument, and a catch arranged in the path of the arm for locking the gathering instrument against swinging movement.

26. In a glass gathering machine, the combination of a pivotally mounted glass gathering instrument, a vibratory shaft having an arm connected with the gathering instrument, and front and rear catches arranged in the path of the arm for locking the gathering instrument at the end of each oscillatory movement.

27. In a glass gathering machine, the combination of a pivotally mounted oscillatory gathering instrument, means for swinging the gathering instrument to and from a pot or tank, and means for locking the gathering instrument at the limit of its backward movement to hold the same while the glass is being cut.

28. In a glass gathering machine, the combination of a pivotally mounted glass gathering instrument, means for swinging the same to and from a pot or tank, a catch arranged to lock the gathering instrument at the limit of its backward movement, and cam actuated means operating the catch to release the gathering instrument.

29. In a glass gathering machine, the combination of a pivotally mounted glass gathering instrument, means for swinging the same to and from a pot or tank, a pivotally mounted catch arranged to lock the gathering instrument at the limit of its backward movement, a lever, rotary means for actuating the lever, and means for connecting the lever with the catch.

30. In a glass gathering machine, the combination of a pivotally mounted gathering instrument, means for swinging the same to and from a pot or tank, a spring actuated catch for locking the gathering instrument at the limit of its backward movement, a lever having one of its arms engaging the catch, an inclined lever connected with the other arm of the said lever, and means for intermittently operating the inclined lever.

31. In a glass gathering machine, the combination of a pivotally mounted gathering instrument, means for swinging the same to and from a pot or tank, cutting mechanism for severing a portion of the glass from the instrument, a catch for locking the gathering instrument at the limit of its backward movement, and means for operating the cutting mechanism and for simultaneously operating the catch to release the gathering instrument.

32. In a glass gathering machine, the combination of a pivotally mounted gathering instrument, means for swinging the same to and from a pot or tank, shears having a pair of movable blades or jaws, a rock shaft having arms connected with the blades or jaws, and means for operating the rock shaft.

33. In a glass gathering machine, the combination of a pivotally mounted gathering instrument, means for swinging the same to and from a pot or tank, shears having a pair of movable jaws and provided with laterally extending arms, a rock shaft provided with arms, rods extending from the arms of the rock shaft to the arms of the blades or jaws, and means for operating the rock shaft.

34. In a glass gathering machine, the combination of a pivotally mounted gathering instrument, means for swinging the same to and from a tank or pot, a catch for locking the gathering instrument at the limit of its backward movement, cutting mechanism for severing a portion of the glass from the instrument, a rock shaft connected with the cutting mechanism for actuating the same, a lever connected with the rock shaft, means actuated by the lever for operating the catch, and means for actuating the lever.

35. In a glass gathering machine, the combination of a pivotally mounted gathering instrument, means for swinging the same to and from a tank or pot, a catch for locking the gathering instrument at the limit of its backward movement, cutting mechanism for severing a portion of the glass from the instrument, a rock shaft connected with the cutting mechanism for actuating the same, a lever connected with the rock shaft, means actuated by the lever for operating the catch, and a wheel having an eccentrically arranged pin for actuating the lever.

36. In a glass gathering machine, the combination of a pivotally mounted gathering instrument, means for swinging the same to and from a pot or tank, a catch for locking the gathering instrument at the limit of its backward movement, cutting mechanism, a lever connected with the cutting mechanism for actuating the same, said lever being provided with a tapered portion, a wheel having an eccentrically arranged pin for engaging the tapered portion of the lever, and means actuated by the lever for operating the catch.

37. In a glass gathering machine, the combination of a pivotally mounted gathering instrument, means for swinging the same to and from a pot or tank, means for holding the gathering instrument stationary at the limit of its backward movement to cause the glass to drip from it, and means for imparting a rotary movement to the gathering instrument to wind up the glass after a portion has been severed.

38. In a glass gathering machine, the combination of a pivotally mounted gathering instrument, means for swinging the same to and from a pot or tank, means for holding the gathering instrument stationary at the limit of its backward movement to cause the glass to drip from it, cutting mechanism for severing a portion of the glass, and means for imparting a rotary movement to the gathering instrument to wind up the glass after the same has been cut.

39. In a glass gathering machine, the combination of a pivotally mounted gathering instrument, means for swinging the same to and from a pot or tank, a catch for holding the gathering instrument at the limit of its backward movement, and means for imparting a rotary movement to the gathering instrument after a portion of glass has been severed to cause the gathering instrument to wind up the unused portion of glass.

40. In a glass gathering machine, the combination of a pivotally mounted gathering instrument, means for swinging the same to and from a pot or tank, a continuously rotating element located adjacent to the gathering instrument when the latter is at the limit of its backward movement, and means for moving the gathering instrument into engagement with the said rotary element to impart a rotary movement to the gathering instrument to cause the same to wind up the unused portion of glass.

41. In a glass gathering machine, the combination of a pivotally mounted gathering instrument, a pinion carried by the same, means for swinging the gathering instrument to and from a pot or tank, cutting mechanism arranged below the gathering instrument when the same is at the limit of its backward movement, means for operating the cutting mechanism, a continuously rotating gear, and means for moving the pinion of the gathering instrument into mesh with the said gear to impart a rotary movement to the gathering instrument to wind up the unused portion of the glass after the cutting operation.

42. In a glass gathering machine, the combination of a pivotally mounted gathering instrument, a pinion carried by the same, means for swinging the gathering instrument to and from a pot or tank, a continuously rotating gear located adjacent to the gathering instrument when the latter is at the limit of its backward movement, a movable support for holding the pinion out of mesh with the gear, and means for operating the support to permit the pinion to mesh with the gear to wind up the unused portion of glass.

43. In a glass gathering machine, the combination of a pivotally mounted gathering instrument, a pinion carried by the same, means for swinging the gathering instrument to and from a pot or tank, a continuously rotating gear located adjacent to the gathering instrument when the latter is at the limit of its backward movement, a movable support for holding the pinion out of mesh with the gear, means for operating the support to permit the pinion to mesh with the gear to wind up the unused portion of glass, and means for positively actuating the gathering instrument to carry the pinion into mesh with the continuously rotating gear.

44. In a glass gathering machine, the combination of a pivotally mounted gathering instrument, a pinion carried by the same, means for swinging the gathering instrument to and from a pot or tank, a continuously rotating gear located adjacent to the gathering instrument when the latter is at the limit of its backward movement, a movable support for holding the pinion out of mesh with the gear, means for operating the support to permit the pinion to mesh with the gear to wind up the unused portion of glass, and a catch for holding the gathering instrument at the limit of its backward movement, said catch being arranged to positively actuate the gathering instrument to move the pinion into mesh with the positively rotating gear.

45. In a glass gathering machine, the combination of a pivotally mounted gathering instrument, a vibratory shaft having an arm connected with the gathering instrument, means for imparting a rotary movement to the gathering instrument to wind up the unused portion of glass, a pivoted support arranged to receive the arm for holding the gathering instrument out of engagement with the latter means, and means for swinging the pivoted support to permit the gathering instrument to drop into engagement with the means for rotating it.

46. In a glass gathering machine, the combination of a pivotally mounted gathering instrument, means for swinging the same to and from a pot or tank, a vibratory shaft having an arm connected with the gathering instrument, an adjustable projection carried by the arm, a movable support arranged to receive the projection, and rotary elements for imparting a rotary movement to the gathering instrument to wind up the unused portion of glass, said rotary elements being held out of engagement by the support, and means for operating the support to permit the rotary elements to engage each other.

47. In a glass gathering machine, the combination of a pivotally mounted gathering instrument, means for swinging the same to and from a pot or tank, rotary elements arranged to impart a rotary movement to the gathering instrument to wind up the unused portion of glass, means for holding the said elements out of engagement while the glass is being cut, and means for causing the rotary elements to engage each other at the completion of the cutting operation.

48. In a glass gathering machine, the combination of a pivotally mounted gathering instrument, means for swinging the same to and from a pot or tank, cutting mechanism, a catch for holding the gathering instrument at the limit of its backward movement, rotary elements for imparting a rotary movement to the gathering instrument to wind up the unused portion of glass, a movable support for holding the rotary elements out of engagement with each other, a lever connected with the cutting mechanism, the catch and the support, and means for actuating the lever to simultaneously operate the cutting mechanism and the catch to withdraw the support.

49. In a glass gathering machine, the combination of a vertically movable rod provided with teeth, a gathering instrument mounted on the rod and provided with teeth to engage those of the said rod, means for swinging the gathering instrument to and from a pot or tank, and means to impart a rotary movement to the gathering instrument.

50. In a glass gathering machine, the combination of a pivotally mounted gathering instrument, gearing for rotating the same, a master-wheel operated by the said gearing and having ratchet teeth, means operated by the master-wheel for swinging the gathering instrument to and from a pot or tank, a clutch for throwing the master-wheel into and out of operation, and a pawl arranged to engage the ratchet teeth of the master-wheel to hold the latter against backward movement when the same is thrown out of operation.

51. In a glass gathering machine, the combination of a pivotally mounted gathering instrument, means for swinging the same to and from a pot or tank, means for imparting a partial rotary movement to the gathering instrument during the oscillation thereof, and means for checking and holding the gathering instrument against further rotary movement.

52. In a glass gathering machine, the combination of a pivotally mounted gathering instrument, means for oscillating the same, gearing for imparting to the gathering instrument a partial rotary movement during the oscillation thereof, and interlocking means for holding the gathering instrument against further rotary movement.

53. In a glass gathering machine, the combination of a pivotally mounted gathering instrument, means for swinging the same, a pinion carried by the gathering instrument, a curved rack arranged in the path of the pinion for imparting a partial rotary movement to the gathering instrument, and means for holding the gathering instrument against further rotary movement when the pinion leaves the rack.

54. In a glass gathering machine, the combination of a gathering instrument pivoted at its inner end and provided thereat with teeth, means for swinging the gathering instrument to and from a pot or tank, means for imparting a partial rotary movement to the gathering instrument during the oscillatory movement thereof, and relatively fixed teeth to interlock with the teeth of the gathering instrument for holding the latter against further rotary movement.

55. In a glass gathering machine, the combination of a bar or member provided with teeth, a gathering instrument pivotally mounted on the bar or member and provided with teeth to interlock with the said teeth, means for swinging the gathering instrument to and from a pot or tank, and gearing for imparting a partial rotary movement to the gathering instrument during the oscillatory movement thereof, said teeth being arranged to lock the gathering instrument against further rotary movement.

56. The combination of a pivotally mounted gathering instrument, gathering mechanism embodying means for oscillating the gathering instrument to move the same toward and from a tank, and means for moving the gathering instrument into and out of the tank, gearing arranged for continuously rotating the gathering instrument when the same is at the tank, and means for throwing the gathering mechanism out of operation while the gathering instrument is at the tank and without stopping the rotary movement of the said instrument.

57. The combination of a pivotally mounted gathering instrument, gathering mechanism embodying means for oscillating the gathering instrument to move the same toward and from a tank, and means for moving the gathering instrument into and out of the tank, gearing arranged for continuously rotating the gathering instrument when the same is at the tank, means for throwing the gathering mechanism out of operation while the gathering instrument is at the tank and without stopping the rotary movement of the said instrument, and means for locking the gathering instrument to prevent the same from swinging backward when the gathering mechanism is thrown out of operation.

58. In a glass gathering machine, the combination of a pivotally mounted gathering instrument, means for swinging the same to and from a pot or tank, and cutting mechanism located below the gathering instrument when the latter is at the limit of its rearward movement to cut off the glass.

In testimony, that I claim the foregoing as my own, I have hereto affixed my signature in the presence of two witnesses.

ROSS D. BROWN.

Witnesses:
WM. R. DODGE,
WILLIAM McKENZIE.